Patented Oct. 27, 1936

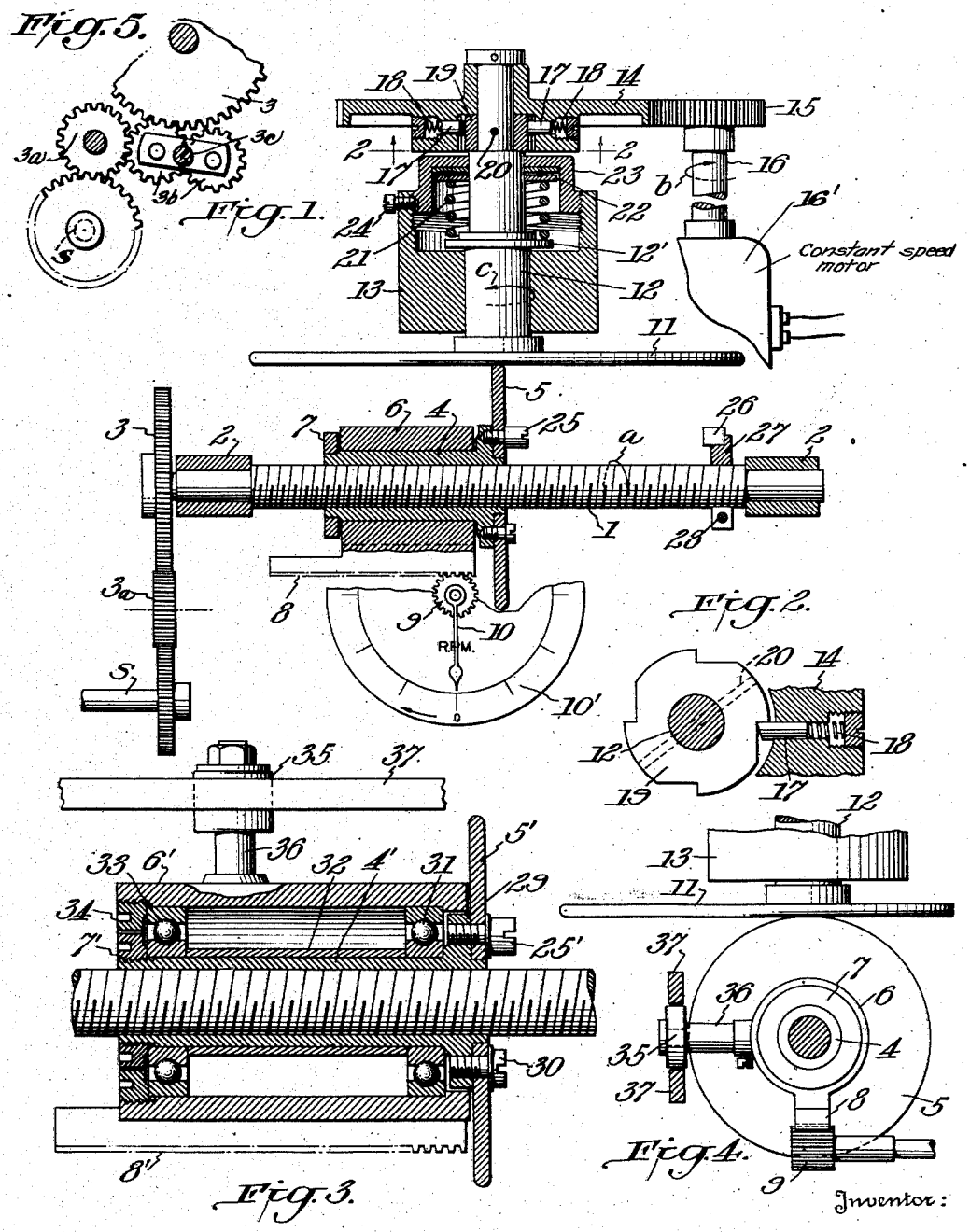
Oct. 27, 1936.  P. VAN S. KOLFF  2,059,118
SPEED INDICATOR
Filed Dec. 20, 1934

2,059,118

UNITED STATES PATENT OFFICE 2,059,118

SPEED INDICATOR

Petrus van Santen Kolff, Philadelphia, Pa.

Application December 20, 1934, Serial No. 758,535

10 Claims. (Cl. 264—9)

This invention relates to speed indicators and more particularly to speed indicators of the type in which the indicating element is displaced in accordance with the resultant of motion derived from the shaft under investigation and a shaft which is rotated at a constant speed.

Indicating devices of this general type have been previously proposed and have the operating advantage of producing a straight line displacement which, through a rack and pinion may be translated into a rotary displacement of an indicating needle, or other device, to show the speed of a variable speed shaft in revolutions per minute or if desired, in some function which varies with the speed of the shaft.

An object of the invention is to provide a speed indicator of simple construction which is efficient in operation under normal conditions and is protected from serious damage in the event that abnormal operating conditions should arise. An object is to provide a speed indicator of the type in which a rotating disk is subjected to the influence of two different motion transmitting mechanisms, one mechanism being actuated at constant speed and the other in accordance with the speed of the shaft under investigation, and which includes mechanical devices for preventing damage in the event that the first mechanism fails to function properly and/or the second mechanism is operated at abnormally high speed.

A further object is to provide a speed indicator including a rotating disk which is axially displaced in accordance with the speed of the shaft under investigation, and which includes a simple and rugged mechanism for translating the axial movement of the disk into a rotary motion of a speed indicating needle or the like.

These and other objects and advantages of the invention will be apparent from the following specification when taken with the accompanying drawing, in which:

Fig. 1 is a central vertical section through an embodiment of the invention, the parts being illustrated in the positions which they occupy when the variable speed shaft is at rest;

Fig. 2 is a fragmentary sectional view on line 2—2 of Fig. 1;

Fig. 3 is a fragmentary vertical section through a modified construction;

Fig. 4 is a fragmentary end view of a further embodiment, and

Fig. 5 is a fragmentary side elevation of a gear train for driving the indicator.

In the drawing, the reference numeral 1 identifies the screw shaft which is mounted in bearings 2 and rotated in the direction of the arrow $a$ by the shaft S which is under investigation; the train of driving gears 3, 3a between shafts 1 and S including a known type of unidirectional gearing if the shaft S is reversible. As shown in Fig. 5, the gear 3a is rotated in either direction by shaft S and meshes with one of the pair of gears 3b which are carried by a rocker having a pivotal support 3c; the rocker tilting automatically in accordance with the direction of the driving force to include one or both of the gears 3b in the train between shaft S and gear 3, whereby the gear 3 and shaft 1 always rotate in the direction indicated by arrow $a$. A nut 4 is threaded upon the shaft 1 and has a friction disk 5 secured to one end thereof. A non-rotating sleeve 6 is mounted on the nut 5 and is prevented from axial displacement along the nut by a collar 7. The sleeve 6 has a rack bar 8 integral with or secured to one side thereof for engagement with the pinion 9 that may be equipped with an indicating needle 10 that is movable over a scale 10' that is graduated in revolutions per minute or in terms of some factor which varies with the speed of the shaft S. The important feature is that the pinion 9 is displaced, as will be explained hereinafter, in accordance with the speed of shaft S, but it is immaterial whether the speed indicating needle is actuated directly by the pinion 9 or is actuated through some known type of motion transmitting mechanism.

A second friction disk 11 is mounted upon shaft 12 whose axis passes through and is normal to the axis of the screw shaft 1. The shaft 12 is mounted in a bearing 13 and is rotated through gears 14, 15 from the shaft 16 that is operated at constant speed in the direction of arrow $b$ by suitable mechanism, such as a synchronous motor 16'. The gear 14 is not keyed to the shaft 12 but has a depending collar in which a plurality of pawls 17 are slidably mounted, the pawls being pressed outwardly by springs 18 to engage the ratchet wheel 19 that is secured to shaft 12 by a pin 20. The notched edge of the ratchet wheel is so designed, as shown in Fig. 2, as to provide a positive drive for rotating shaft 12 in the direction of arrow $c$ so long as the shaft 16 is rotating.

The friction disk 11 is held in firm engagement with the rim of the disk 5 by the spring 21 which is positioned between the collar or flange 12' on shaft 12 and an end thrust bearing 22 that is seated in the cupped nut 23. The nut 23 is threaded into the bearing member 13 and may be locked in any desired position by the set screw 24.

It has been customary to provide speed indicators of this general type, i. e., those including two friction members rotated, respectively, at constant speed and at a variable speed, with some form of electrically actuated protective mechanism. The objection to such constructions is that damage may result from a failure of the electrical system which drives the constant speed shaft and, obviously, the electrical protective devices will likewise fail to function when the power system fails. In accordance with this invention, the protective system is entirely mechanical and therefore remains in operation in the event that the constant speed drive fails. This mechanical protective system includes the lug 25 which projects from the face of the disk 5 and which may be the elongated head of one of the screws which secures the disk 5 to the nut 4. The lug 25 is so positioned as to engage the stop 26 when the nut 4 and disk 5 tend to move too far to the right. The stop 26 is carried by a clamp or split nut 27 which may be fixed in desired position along the screw shaft 1 by the bolt 28.

The operation of the indicator will be apparent from a consideration of the two different manners in which the nut 4 and disk 5 may be axially displaced. Assuming the disk 5 and nut 4 are prevented from rotating, the rotation of the screw shaft 1 would carry the nut 4 towards the right. If the screw 1 is stationary and disk 5 is to the right of the axis of disk 11, the rotation of disk 11 will turn the disk 5 to move the nut 4 and disk 5 towards the left. This motion is arrested, of course, when the rim of disk 5 reaches the axis of the disk 11. When disk 11 is rotated by the constant speed shaft 16 and the screw shaft is rotated by the variable speed shaft S, the nut 4 and disk 5 are displaced axially until the linear velocity of the rim of disk 5 is equal to the linear velocity of the effective diameter of the disk 11. When this condition is reached, the screw shaft 1 and the nut 4 are rotating at the same speed and therefore there is no longer any tendency for the nut 4 to move along the screw shaft 1. The axial displacement of the nut 4 which was required to establish this balance is a measure of the speed of shaft S, and this axial displacement is translated into an angular displacement of the indicator needle 10 by the rack 8 and pinion 9.

In the absence of any protective mechanism, damage would result if the shaft S were operated above some predetermined limit and/or if the constant speed shaft 16 should stop rotating. In either event, the disk 5 would be displaced so far to the right that it would pass beyond the edge of the disk 11. Furthermore, the disk 5 would tend to drive the disk 11 under either of these conditions and, with a rigid drive between shaft 16 and disk 11, the strain thus placed on screw shaft 1, nut 4 and the disks might be excessive.

No damage can result, however, to the described apparatus since the stop 25 on disk 5 engages the stop 26 that is mounted on screw shaft 1 when the disk 5 has been displaced a predetermined distance to the right. The position of stop 26 is so adjusted, by means of the adjustable clamp 27, that the lateral faces of the stops engage squarely when the rim of disk 5 is spaced by a substantial distance from the edge of disk 11. The nut 4, disk 5 and screw shaft 1 will then rotate as a unit, thus preventing a further displacement of the disk 5 towards the right. If the constant speed drive to the disk 11 had stopped completely or was operating the disk 11 at less than the speed suitable for the end position of the disk 5, the pawl and ratchet 17, 19 permit the disk 5 to drive the disk 11 independently of the constant speed shaft 16.

A preferred construction of the follower nut and rack sleeve is shown in Fig. 3. The nut 4' has a circumferential flange 29 against which the disk 5' is secured by screws 30, one such screw having an elongated head 25' to serve as a stop member of the protective system. A pair of ball bearings are mounted on the nut 4', the inner bearing 31 being seated against the flange 29 and held against axial displacement by the spacing sleeve 32 when the nut 7' is threaded upon nut 4' to engage the outer bearing 33. The inner end of the sleeve member 6' has an internal flange which rests against the outer race of the bearing 31 when the nut 34 is threaded upon the sleeve, thus preventing axial displacement of the sleeve 6' with respect to the nut 4'. The rack bar 8' is preferably integral with sleeve 6' and, as shown, some means other than the rack bar is preferably employed to prevent rotation of the sleeve member. A roller 35 is mounted upon a post 36 which is fixed to the sleeve 6', and the roller travels between guide rails 37 to restrict the movement of the sleeve to a straight line displacement.

The same system of a guide roller 35 and guide rails 37 may be employed with the nut 4 and rack sleeve 6 of Fig. 1. Such an arrangement is illustrated in Fig. 4.

It will be apparent that there is some latitude in the design and construction of the several parts of the indicating device and that various changes may be made without departing from the spirit of my invention as set forth in the following claims.

I claim:

1. In a speed indicating device, the combination with a screw shaft adapted to be rotated by the shaft under investigation, a nut threaded on said screw shaft and carrying a friction disk, a friction disk engaging said first disk and rotatable about an axis normal to the axis of said screw shaft, means including a one-way clutch for rotating said second disk at a constant speed, a non-rotating sleeve on said nut, means preventing relative axial displacement of said nut and sleeve, and means actuated by said sleeve to indicate the speed of the shaft under investigation; of means restricting the displacement of said nut along said screw shaft; said restricting means comprising a pair of cooperating stop members carried respectively on said first disk and by said screw shaft, said members engaging to rotate said nut and said screw shaft as a unit.

2. A speed indicating device as claimed in claim 1, wherein the stop member carried by said screw shaft is mounted upon a clamp nut secured to said screw shaft.

3. In a speed indicating device, the combination with two rotatable members in frictional engagement, a shaft to which one member is secured, a screw shaft, a nut threaded upon said screw shaft and carrying the second member, means for rotating one shaft at constant speed and means for rotating the other shaft from a variable speed shaft, and means responsive to displacement of the nut along said screw shaft for indicating the speed of said variable speed shaft, of ratchet and pawl means forming a one-way clutch between said first shaft and its rotating means, and a pair of stop members on said screw shaft and connected to said nut, respectively, to limit the axial displacement of said nut along said screw shaft.

4. In a speed indicating device of the type including a pair of friction disks and means for rotating one disk at constant speed, a screw shaft adapted to be rotated by a variable speed shaft, a nut threaded upon said screw shaft, a sleeve on and substantially enclosing said nut, means securing said sleeve and nut against axial displacement while permitting relative rotation of the same, means restricting movement of said sleeve to a straight line motion, a rack bar carried by said sleeve, an indicating needle movable over a graduated scale, and means including a pinion in mesh with said rack bar for actuating said indicating needle.

5. A speed indicating device as claimed in claim 4, wherein said nut has a circumferential flange to which the second friction disk is secured; and said securing means comprises bearings mounted upon and secured against axial displacement along said nut, said sleeve being rotatably supported on said bearings, and means preventing axial displacement of said sleeve and bearings.

6. A speed indicating device as claimed in claim 4, wherein said nut has a circumferential flange to which the second friction disk is secured; and said securing means comprises a ball bearing seated against said flange, a second ball bearing on said nut, means preventing axial displacement of said ball bearings, and means mounting said sleeve on said ball bearing, said mounting means preventing axial displacement of said sleeve and bearings.

7. A speed indicating device as claimed in claim 4, wherein said movement restricting means comprises a post secured to said sleeve, a roller rotatably mounted on said post, and guide rails at opposite sides of said roller.

8. In a speed indicating device, a screw shaft adapted to be rotated by a variable speed shaft, a nut threaded on said screw shaft, a friction disk on said nut, indicating means actuated by axial displacement of said nut, a second friction disk on a constant speed shaft normal to the axis of said screw shaft, the rim of said first disk engaging the surface of the second disk, a bearing in which said constant speed shaft is rotatably mounted, means including an end thrust bearing and spring for forcing said second disk against the rim of the first disk, and means for adjusting the pressure exerted upon said second disk by said spring.

9. A speed indicating device as claimed in claim 8, wherein said adjusting means comprises a cupped nut threaded into said bearing, and means preventing inadvertent rotation of said nut, said thrust bearing being seated upon said cupped nut.

10. In a speed indicating device of the type including two rotatable members in frictional engagement, a shaft and means for driving the same from a rotating element whose speed is to be indicated, a nut threaded upon said shaft and having a circumferential flange at one end thereof, a friction disk secured to the flange end of said nut, ball bearings having the inner races thereof mounted on said nut adjacent the opposite ends thereof, a sleeve member supported by the outer races of said ball bearings, means preventing axial displacement of said sleeve member with respect to said nut, a rack carried by said sleeve member, and guide means restricting movement of said sleeve member to an axial displacement upon relative rotation of said nut and said shaft.

PETRUS VAN SANTEN KOLFF.